(12) United States Patent
Freeman et al.

(10) Patent No.: US 6,356,288 B1
(45) Date of Patent: *Mar. 12, 2002

(54) DIVERSION AGENT USES CINEMATOGRAPHIC TECHNIQUES TO MASK LATENCY

(75) Inventors: Martin Freeman, Palo Alto; Yevgeniy Shteyn, Cupertino, both of CA (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,827

(22) Filed: Dec. 22, 1997

(51) Int. Cl.[7] .................................................. G09G 5/00
(52) U.S. Cl. ........................ 345/867; 345/473; 345/726; 463/31
(58) Field of Search ................................ 345/348, 349, 345/473, 474, 475, 726, 867; 463/31

(56) References Cited

U.S. PATENT DOCUMENTS

| | | | | |
|---|---|---|---|---|
| 5,528,744 A | * | 6/1996 | Vaughton | 345/348 |
| 5,655,081 A | * | 8/1997 | Bonnell et al. | 395/200.32 |
| 5,724,492 A | * | 3/1998 | Mathews et al. | 345/419 |
| 5,730,602 A | * | 3/1998 | Gierhart et al. | 434/155 |
| 5,737,619 A | * | 4/1998 | Judson | 395/761 |
| 5,781,894 A | * | 7/1998 | Petrecca et al. | 705/14 |
| 5,801,698 A | * | 9/1998 | Lection et al. | 345/347 |
| 5,805,815 A | * | 9/1998 | Hill | 395/200.48 |
| 5,908,467 A | * | 6/1999 | Barret et al. | 709/218 |
| 5,959,621 A | * | 9/1999 | Nawaz et al. | 345/329 |
| 5,996,007 A | * | 11/1999 | Klug et al. | 709/218 |
| 6,005,561 A | * | 12/1999 | Hawkins et al. | 345/327 |
| 6,157,933 A | * | 12/2000 | Celi, Jr. et al. | 707/501 |

* cited by examiner

*Primary Examiner*—Ba Huynh
(74) *Attorney, Agent, or Firm*—Peter Verdonk

(57) ABSTRACT

A software agent is a functional part of a user-interactive software application running on a data processing system. The agent creates a user-perceptible effect in order to mask latency present in delivery of data to the user. The agent creates the effect employing cinematographic techniques.

13 Claims, 4 Drawing Sheets

DIVERSION AGENT USES CINEMATOGRAPHIC TECHNIQUES TO MASK LATENCY

FIELD OF THE INVENTION

The invention relates to a software agent for use in an interactive software application, in particular, but not exclusively, such as for a virtual-environment or for a video game.

BACKGROUND ART

The Internet has opened up new opportunities for interaction and collaboration. Users may interact in real time or off-line and a synchronously through electronic mail. The more intimate the interaction, the more difficult it becomes to deal with the uncertainties associated with delays caused by network latency, bandwidth limitation, etc. For instance, in a networked multimedia game where two users are engaged in hand-to-hand combat, network latency may spoil the interactivity of the game.

U.S. patent application Ser. No. 08/722,413 (PHA 23,156), incorporated herein by reference, discloses a system for processing an interactive software application that governs an interaction between two or more users in a virtual environment. The system comprises user-interface machines for actuation by respective ones of the users. The machines are interconnected via a network. In order to eliminate latency, a specific user is, under circumstances, represented at another user's machine by a proxy agent whose response to an action of the other user is governed by a rule base stored in the other user's machine. The proxy agent is an entity within the virtual environment that interacts with that environment according to its own agenda. In above example, the proxy agent takes over control from the user in a situation wherein the latency involves direct, close-proximity interaction between players and/or objects via the virtual environment software application.

OBJECT OF THE INVENTION

It is an object of the invention to provide an alternative and more general approach to the problem of delays such as caused by network latency.

SUMMARY OF THE INVENTION

To this end, the invention provides a software agent for use in an interactive software application that runs on a data processing system. The agent comprises an input for receiving information about a delay in presenting data to the user, and an effector for masking the delay by selectively creating a user-perceptible effect dependent on the delay under control of the application. The effector selectively creates the effect dependent on a duration of the delay, e.g., measured network latency, and possibly dependent on further criteria such as the state of the application (e.g., the progress of a video game), the status of the user or the history of the user interacting with the application. How to measure latency in the data transmission over a network is known in the art and is discussed in some detail further below. The agent creates the effect using a cinematographic technique. That is, the image displayed to the user, the sounds supplied via the system's loudspeaker or the tactile feedback to the user are artificially manipulated to create a special effect. The software agent thus masks the delays associated with network latency by diverting the user. Preferably, the agent is capable of generating the effect using a respective one of multiple cinematographic techniques. The agent employs a respective one of the techniques, for example, dependent on a respective one of multiple ranges of the delay measured. The cinematographic techniques may comprise, for example, a replacement of a scene by a close-up of part of the scene (zooming-in) or by a distant view on the scene (zooming-out). Another technique is to introduce one or more dummy objects or beings into the scene blocking the view or diverting the viewer. The dummy can be context-related or can be independent of the software application's context. Thus, network latency is virtually eliminated. The dummy is made local to the user's machine so that the network is not involved. Yet another technique is to change to an interlude or to use context switching among scenes. Preferably, the agent generates a type of effect different from the effects that the user has seen previously, thus taking into account the individual history of the application as experienced by the user. This reduces the chance that the user will become aware of the fact that he/she is being distracted. For example, the agent could select randomly or according to some other scenario from among the cinematographic effects available (zoom-in, zoom out, dummy, context switching, interlude, etc).

As is clear, the user-perceptible effect created by the diversion agent need not be limited to visual impressions. Assume, for example, that the user participates in a multiple-user video game involving a contest among individuals or teams. The agent can distract the user at the moment the delay occurs in the data delivery by, e.g., sending spoken praising messages or spoken recommendations on certain playing techniques, or by creating surprising sound effects.

Below, the software agent of the invention will be referred to as a "diversion agent". Note that the proxy agent of U.S. patent application Ser. No. 08/722,413 (PHA 23,156) mentioned above represents one user at the machine of another user, especially under conditions involving close-proximity interaction. In the current invention, however, the diversion agent is activated based on the amount of latency determined, is independent of close-proximity interaction and need not represent a user at another user's machine. The diversion agent evokes effects based on cinematographic techniques.

BRIEF DESCRIPTION OF THE DRAWINGS

The invention is explained in further detail, by way of example and with reference to the accompanying drawings, wherein.

Same reference numerals throughout the drawings indicate similar or corresponding features.

PREFERRED EMBODIMENTS

Figure 1:
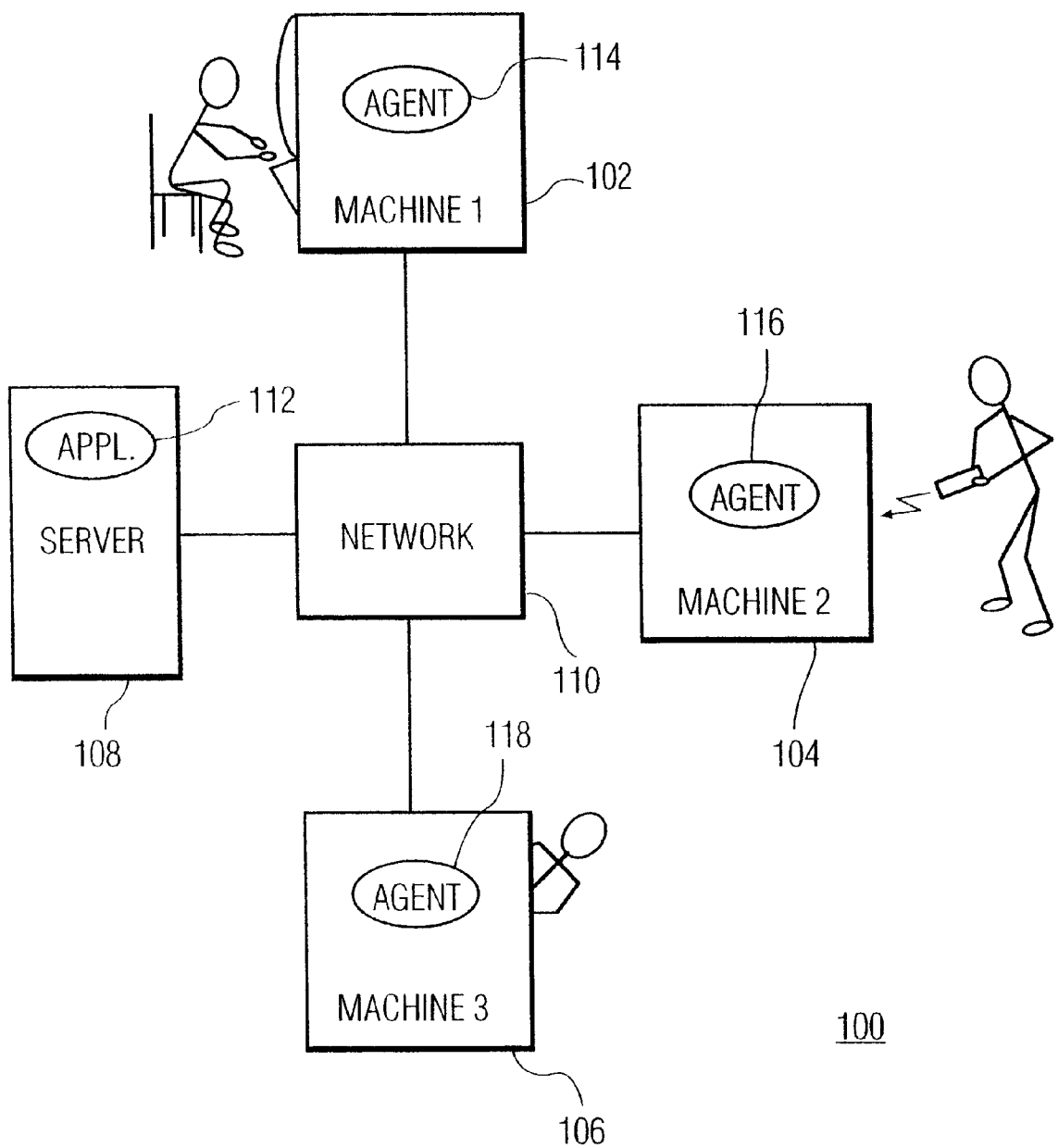
FIG. 1 is a block diagram of a multiple-user system.

FIG. 1 is a block diagram of a multiple-user system 100 comprising multiple data processing machines 102, 104, . . . , 106 interconnected to each other and to a server 108 through a network 110. Each of machines 102–106 has an appropriate user-interface comprising a display and a maneuvering device or another type of user-input device, and comprises, e.g., a PC. Server 108 runs an interactive software application 112 that comprises, for example, a multi-player video game. A respective diversion agent 114, 116 and 118 is downloaded from server 108 onto the storage of a respective one of machines 102–106, e.g., upon initialization of the game or upon a machine having registered as a participant with server 108.

Here, diversion agents 114–118 are pieces of software that are functional components of application 112. In the multi-player game played at machines 102–106, all game actions (i.e., state changes) are sent to all of agents 114–118, at least to those to which the information is relevant. See U.S. patent application, Ser. No. 08/722,414 (PHA 23,155), discussed in some detail below. For example, if users 102 and 104 have not interacted before through system 100 and meet each other for the first time in the virtual environment created by application 112, agents 114 and 116 need to get all relevant information about the status of user 104 and 102, respectively.

Now, the agent on each particular one of the machines, e.g., agent 114 on machine 102, is always expecting some update of the status of players on other machines 104 and 106. Preferably, this update information comes at regular intervals. If network 110 is congested, this information will not arrive in a timely fashion. Agent 114 measures the time since the last receipt of state information from a location with which it has been engaged in activity. This enables to determine the network latency. The agents are set up with a timer. The diversion techniques used can be based, at least in part, on the amount of latency measured. For more details on intelligent agents, e.g., on agents with integrated timers, see for an example U.S. Pat. No. 5,655,081, herein incorporated by reference. So, for instance, if an acceptable latency is 60 msec, then a certain class of techniques is used between 60–100 ms, another set of techniques would be used between, say, 100–160 msec, and so on. As the latency increases, the techniques preferably become more rigorous. For instance, an initial technique in a combat game between two players may involve making the users see a close-up of the fighters without seeing the blows occur. Here, punching sounds and "oohs" and "ahhs" can be enough, possibly accompanied by corresponding text balloons. More rigorous measures may involve having the combatants warp to another world where they do not face each other (context switching).

The state information in a multi-user game is preferably sent depending on whether or not the players' avatars are within each other's range in the virtual environment created by the game. See, for example, U.S. patent application Ser. No. 08/722,414 (PHA 23,155), herein incorporated by reference. In the invention of the latter application, multiple users share a virtual environment through their avatars in an interactive software application. State changes of a specific user are transmitted to one or more other users dependent on the respective relative distances in the virtual environment between the specific user and each respective one of the other users. This conditional transmission reduces message traffic over network 110 and allows the virtual environment to scale indefinitely.

In the example above, the game state information is being sent regularly in order to determine latency, but there are other means of measuring it. One of the alternatives is to send a message that takes a round trip between machines 102 and 104 and then divide the round trip time by a factor of two. For example, on a Unix machine connected to the Internet, one can enter "ping-s<Internet name of a destination machine>" to send a number of round trip packages to the destination machine and obtain the round trip time. This pinging could be done once, e.g., at the initialization of the game or at the start of the participation by a particular machine, or at regular time intervals to adapt for the dynamic changes in network congestion.

A first alternative embodiment (not shown) of system 100 is one wherein machines 102–106 form a distributed operating system so that a separate server 108 is not needed. The relevant diversion agent is part of the local application. A second alternative embodiment (not shown) of system 100 is one wherein machines 102–106 each comprise a CD-ROM drive for a CD-ROM with an interactive application. Server 108 then takes care of the distribution, among the relevant other users (e.g., users 102 and 104), of the state changes of a specific user (e.g., user 106) with respect to the application on his/her CD-ROM. The relevant diversion agent is part of the program stored on the local CD-ROM (or, in other implementations, on a magnetic disk, on other optical disks such as DVD, or on any other suitable kind of storage medium).

Figure 2:
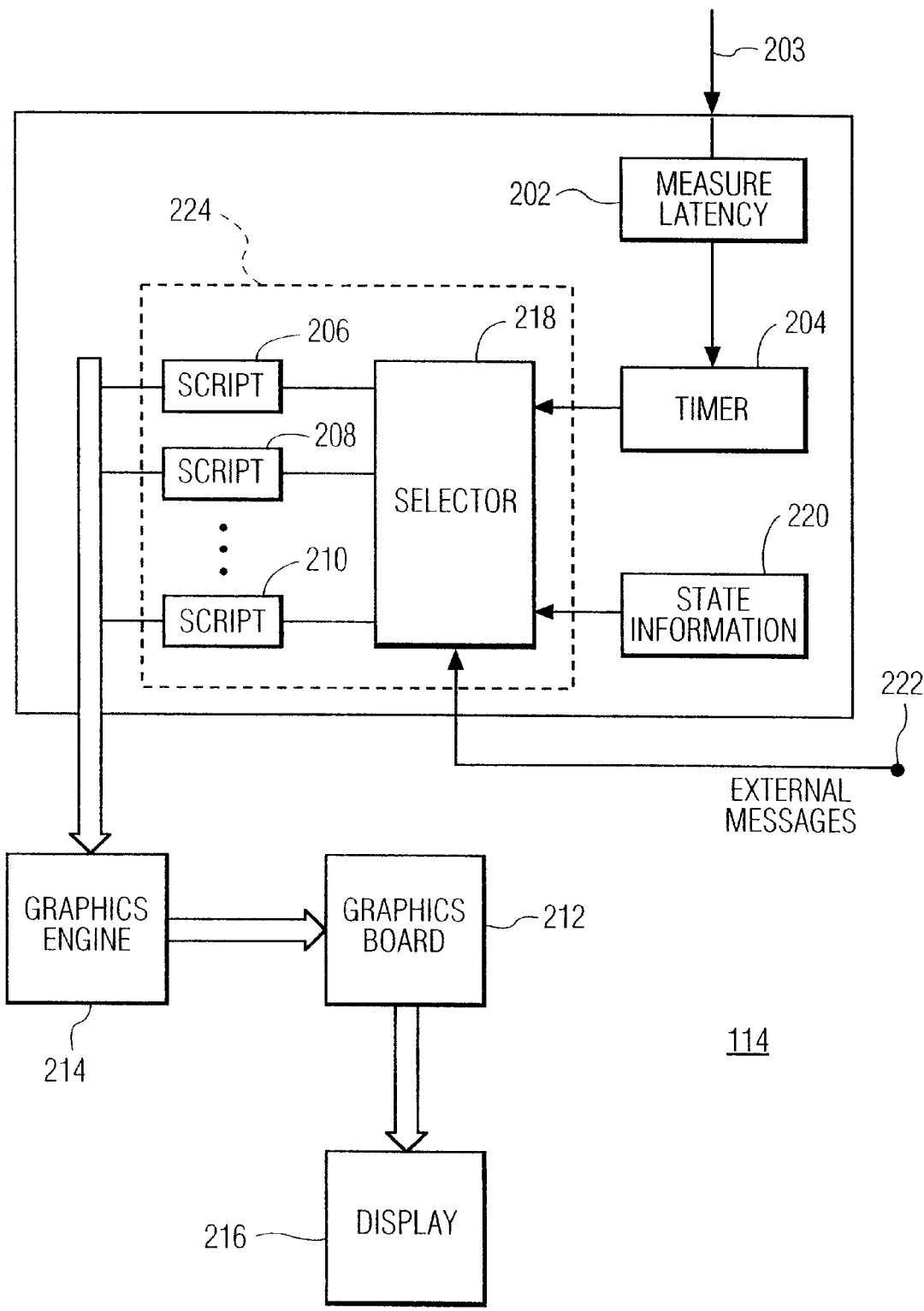
FIG. 2 is a block diagram of a diversion agent.

FIG. 2 is a block diagram of the software components for diversion agent 114 residing on machine 102. In this example, the block diagram is representative of diversion agents 116 and 118 as well. Agent 114 comprises a procedure 202 to determine network latency with regard to communication with each of companion machines 104 and 106 via server 108. Procedure 202 receives information about the latency via an input 203 coupled to network 110. As discussed above, various scenarios for such a procedure exist. Procedure 202 measures the individual latency for the interaction with each of the other participating machines, here 104 and 106, that have registered with application 112. Dependent on the respective ranges of latency measured for each individual one of machines 104 and 106, procedure 202 programs software timer 204 and activates one or more of scripts 206, 210, . . . , 210 at machine 102 upon expiry of timers 204. A script is a set of commands that together cause machine 102 to perform pre-specified operations, here to interfere with the data supplied to the user of machine 102 by generating a user-perceptible effect to mask the latency. Each scenario of interaction between machine 102 with any other machine may require its own individual script. These scripts are part of the interactive application. They may have been downloaded from server 108 to machine 102 upon initialization of its participation to application 112. In one of the alternative embodiments of system 100 mentioned above, the scripts are part of the program on the CD-ROM local to machine 102. The commands of the script selected are supplied to, e.g., a local graphics board 212 of machine 102 via the machine's graphics engine 214 in order to create the user-perceptible effect at a display 216 of machine 102.

The effect is created, for instance, by adding graphics data that covers a substantive portion of the screen of display to achieve the masking effect, for example by adding graphics data to an existing data stream.

Timer 204 comprises, e.g., a virtual timer. A timer circuit can be programmed to trigger after appropriate time periods. Suppose these periods are 60 msec, 90 msec and 150 msec, the physical timer is first set to 60 msec, then to 30 msec, and then to 60 msec.

The appropriate one of scripts 206–210 is chosen by a selection procedure 218 that operates on the basis of various inputs. In the example shown, selection procedure 218 receives input state information 220, such as the state of interactive application 112, state of players 102–106 involved, a history of player actions, a history of scripts activated on previous occasions for this particular player 102, etc. Also, selection procedure 218 receives external messages at an input 222 for, e.g., enabling user 102 to select a preferred subset among scripts 206–210 to be activated, or for inactivating the diversion agent, etc. In addition, external messages can be used to activate a particular diversion script based on a condition other than directly involving network latency. Such a scenario is further discussed below with reference to FIG. 4. The combination of selector 218 and scripts 206–210 serves as an effector 224 that creates a user-perceptible effect under control of the input data supplied via timer 204, and under control of the state information 220 and external messages at input 222.

Figure 3:
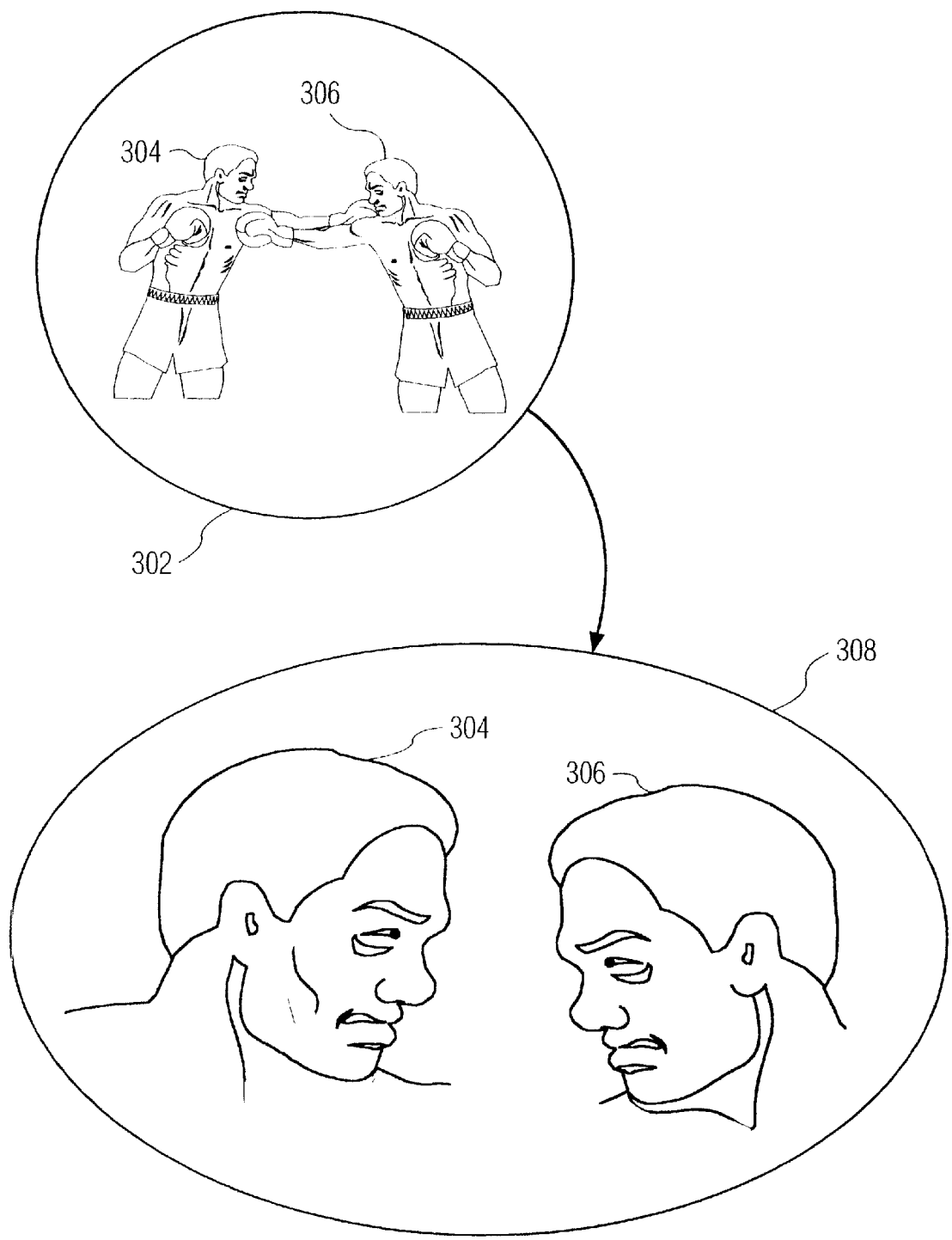
FIGS. 3 and 4 illustrate examples of visual effects created by the diversion agent.

FIG. 3 is a first example of a user-perceptible effect created by diversion agent 114 when undesirable latency has been noticed. A scene 302 as seen by each of the users at their respective machines 102 and 104 involves two avatars 304 and 306 in combat. Each respective one of avatars 304 and 306 represent a respective one of the users at machines 102 and 104, and are controlled directly through appropriate user-interfaces if the latency is acceptable. However, upon machine 102 finding that timer 210 has expired, it switches to script 204 showing a close-up representation 308 of avatars 304 and 306. The facial expressions of avatars 304 and 306 in close-up representation 308 are preferably changing over time, possibly erratically and suddenly, thereby suggesting that they are busy catching well aimed blows from each other without actually showing the exchange of pugilistic information. Additional unexpected effects include, for example, having one of the close-up avatars starting to yell at its opponent.

Diversion agent 114 runs autonomously until system 100 lets the users take over again without the users realizing that they had ever lost control. The amount of latency of the network connection experienced at machines 102 and 104 is considered substantially equal for both when interacting so that diversion agents 114 and 116 may react substantially concurrently. Note that agents 114 and 116 need not select the same type of diversion techniques. Agents 114 and 116 may choose different diversion techniques.

As an alternative to the zooming-in, diversion agent 114 may introduce a distance between avatars 304 and 306 in the virtual environment that is, e.g., proportional to the latency measured. This gives the user at machine 104 the impression that his/her adversary has suddenly jumped back to prepare for the next attack. Agent 116 may act accordingly at machine 104.

Figure 4:
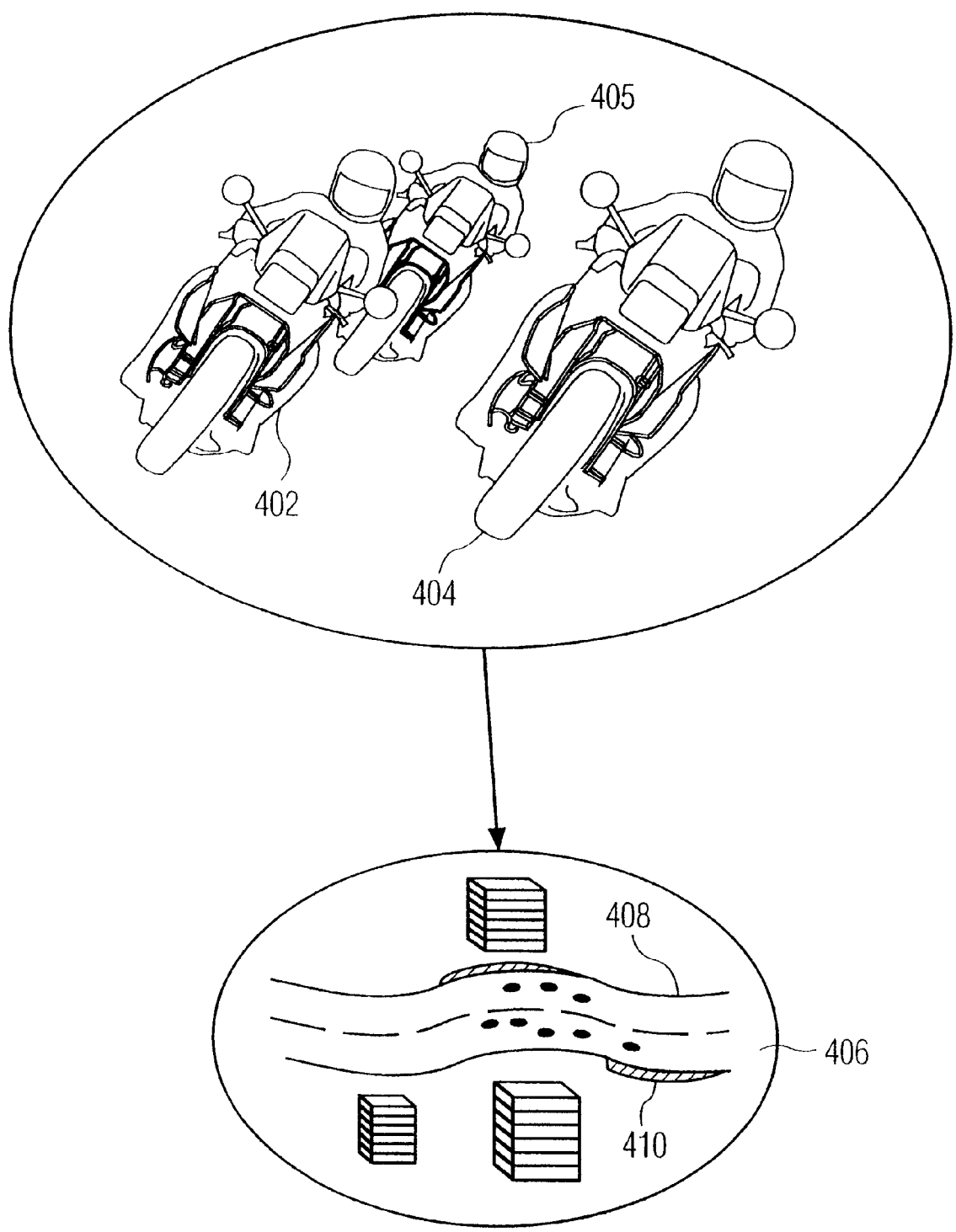

FIG. 4 is a second example of a user-perceptible effect created by diversion agent 114. Here, the users at machines 102 and 104 are engaged in a motorcycle race and have to guide their respective racing avatar 402 and 404 along a racing circuit 406. The user can select one or more points of view that may change during the competition, similar to the various viewpoints offered in flight simulator video games. Scene 408 represents a point of view from close by to illustrate the pursuers, e.g., 405, in detail. Upon machine 102 detecting its latency timer having expired, it switches to a particular script 206 that causes display 218 to give, e.g., a birds-eye view of the current positions 408 and 410 on circuit 406 of avatars 402 and 404. The local data processing for the sake of creating an image now relates to extrapolating the current positions in the field based on the information prior to expiry of the timer so that avatars are still on the track when latency has been brought back to negligible. One diversion technique used is the top view of FIG. 4, where both avatars 402 and 404 are racing neck and neck. In the cinematographic cuts between shots the positions of avatars 402 and 404 may have changed. When the latency condition subsides, there is a cut back to the real situation where one is ahead of the other.

If, in order to handle close-proximity interaction, the proxy agents of U.S. patent application Ser. No. 08/722,413 (PHA 23,156) are used initially, the effect may be that the positions of avatars 402 and 404 as presented on machine 102 are not consistent with the positions as shown on the other machine 104. For example, the proxy agent on machine 102 shows avatar 402 leading avatar 404 and the proxy agent on machine 104 shows the situation the other way round: avatar 404 leading avatar 402. Here, a diversion agent is used at an appropriate moment to establish consistence throughout system 100 by masking the transition to an unambiguous state wherein one of avatars 402 and 404 is leading the other on both machines 102 and 104, brought about by, e.g., a random selection procedure. To attain this consistence, information about the states of the avatars at each of machines 102 and 104 is required. The state of the proxy agent is processed as an external message at input 222 in FIG. 2. Note that the use of the diversion agent here is not directly based on measured latency. The diversion agent is used to mask a problem caused by latency, here as a result of close-proximity interaction taken care of by local proxy agents.

We claim:

1. A method of enabling a user to interact stochastically with a software application in a distributed system comprising multiple data processing machines connected via a data network, the method comprising:

a. under control of a substantially stochastic delay related to communication of data via the network, enabling the creation of a diversionary effect, locally at a data processing machine associated with the user, where the diversionary effect is related to a substantially stochastic context of the software application to mask the delay so as to reduce a chance that the delay causes the user to be distracted from the application.

2. The method of claim 1, wherein the creating of the diversionary effect uses a cinematographic technique.

3. The method of claim 1, wherein the diversionary effect comprises a visual effect on a display monitor of the user.

4. The method of claim 1, wherein the enabling to create comprises providing a software agent.

5. The method of claim 1, wherein a respective diversionary effect is created dependent on a respective magnitude of the determined delay.

6. The method of claim 1, wherein the diversionary effect is created dependent on a history of user-interaction with the application.

7. A software agent for local use at a user and for use with a software application in a distributed system with multiple data processing machines connected via a data network, the agent being operative to create, locally at the user and under control of a substantially stochastic delay in the data communication via the network, a diversionary effect related to a substantially stochastic context of the software application to mask the delay so as to reduce a chance that the delay causes the user to be distracted from the application.

8. The agent of claim 7, operative to determine the delay.

9. The agent of claim 7, using a cinematographic technique to create the diversionary effect.

10. The agent of claim 7, for creating a respective diversionary effect dependent on a respective magnitude of the determined delay.

11. The agent of claim 7, for creating the diversionary effect dependent on a history of user-interaction with the application.

12. A user-interactive software application for a distributed data processing system on a data network, the application comprising a software agent for local use at a user's machine, the agent being operative to create, under control of a network delay, locally at the user a diversionary effect related to a context of the software application to mask the delay so as to reduce a chance that the delay causes the user to be distracted from the application.

13. The application of claim 12, for enabling multi-user interaction, and comprising respective software agents for local use at a respective machine of a respective user, the respective agent being operative to create, under control of a respective network delay, locally at the respective user a respective diversionary effect related to a context of the software application to mask the respective delay so as to reduce a chance that the respective delay causes the respective user to be distracted from the application.

* * * * *